US007925811B2

(12) United States Patent
Ottliczky et al.

(10) Patent No.: US 7,925,811 B2
(45) Date of Patent: Apr. 12, 2011

(54) ELECTROPNEUMATIC MODULE SYSTEM COMPOSED OF INDIVIDUAL MODULES PUT IN A ROW

(75) Inventors: Martin Ottliczky, Forchtenberg (DE); Michael Winkler, Weissbach (DE)

(73) Assignee: Buerkert Werke GmbH, Ingelfingen (DE)

(*) Notice: Subject to any disclaimer, the term of this patent is extended or adjusted under 35 U.S.C. 154(b) by 66 days.

(21) Appl. No.: 11/992,491

(22) PCT Filed: Jul. 27, 2006

(86) PCT No.: PCT/EP2006/007439
§ 371 (c)(1), (2), (4) Date: Mar. 20, 2009

(87) PCT Pub. No.: WO2007/042090
PCT Pub. Date: Apr. 19, 2007

(65) Prior Publication Data

US 2009/0307405 A1 Dec. 10, 2009

(30) Foreign Application Priority Data

Oct. 7, 2005 (DE) ..................... 20 2005 015 791 U

(51) Int. Cl.
*G06F 13/00* (2006.01)
*F16K 11/10* (2006.01)

(52) U.S. Cl. ......................... 710/301; 137/884; 439/191

(58) Field of Classification Search .................. 710/301; 439/191; 137/884
See application file for complete search history.

(56) References Cited

U.S. PATENT DOCUMENTS

| | | | | |
|---|---|---|---|---|
| 4,095,864 | A | 6/1978 | Hardin | |
| 4,385,685 | A | 5/1983 | Sticht | |
| 4,454,857 | A | 6/1984 | Miller et al. | |
| 4,860,458 | A | 8/1989 | Ernstsen | |
| 4,934,332 | A | 6/1990 | Scherz | |
| 5,491,830 | A * | 2/1996 | Ferri | 710/9 |
| 6,024,079 | A | 2/2000 | Ingle et al. | |
| 6,102,074 | A | 8/2000 | Bouteille | |
| 6,213,153 | B1 * | 4/2001 | Hayashi et al. | 137/884 |
| 7,040,027 | B1 | 5/2006 | Shaffer et al. | |
| 2002/0013077 | A1 * | 1/2002 | Lepine et al. | 439/191 |

FOREIGN PATENT DOCUMENTS

| | | | |
|---|---|---|---|
| DE | 28 13 562 | C2 | 5/1987 |
| DE | 196 53 714 | C1 | 12/1997 |
| DE | 30 51 185 | C2 | 1/1999 |
| DE | 100 06 879 | A1 | 8/2001 |

(Continued)

*Primary Examiner* — Glenn A Auve
(74) *Attorney, Agent, or Firm* — Stuart J. Friedman

(57) ABSTRACT

A modular system comprises a head module having at least one connection for an external bus signal on an external bus, at least one pneumatic supply connection, an electric supply connection and having a serial bus interface for an internal serial bus, an electric supply interface, a multipole interface and a pneumatic supply interface which are each led to the outside on the same side. The modular system further comprises at least one functional module having an internal serial bus line, electric supply lines, electric multipole lines and pneumatic supply lines which are each passed through from one side to the opposite side and which are each connected to a corresponding interface of the head module. The head module here converts serial bus signals into multipole signals and outputs these signals at the multipole interface. The functional module selectively branches at least one of the multipole lines and, with a signal carried thereon, executes a pneumatic or an electric or both a pneumatic and an electric function.

20 Claims, 4 Drawing Sheets

FOREIGN PATENT DOCUMENTS

| | | | |
|---|---|---|---|
| DE | 699 12 876 | T2 | 11/2003 |
| DE | 103 16 129 | A1 | 10/2004 |
| EP | 0 962 663 | A2 | 12/1999 |
| EP | 1 070 892 | A2 | 1/2001 |

* cited by examiner

ELECTROPNEUMATIC MODULE SYSTEM COMPOSED OF INDIVIDUAL MODULES PUT IN A ROW

FIELD OF THE INVENTION

The invention relates to a modular system consisting of individual modules which can be mounted side by side in line.

BACKGROUND OF THE INVENTION

In automation systems, electro-pneumatic modular systems are used. A structure of individual modules is suitable in order to be able to construct custom-made systems for the user. Up to now, modules having a pure electronic function and modules having pneumatic functions have to be combined respectively to ensure the supply of the pneumatic modules with the control fluid. In a system expansion, it is thus possibly necessary to remove pneumatic modules to first connect electric modules—or vice versa.

A supply voltage is to be applied both to the electric and to the electro-pneumatic modules. Furthermore, the modules are connected to a control bus, for example to a field bus. When using a control bus system as is usual in automation technique, each individual module requires an address, and each module must be able to decode the signals on the control bus. In a harsh industrial environment with dust atmosphere and/or water, a mounting in a switch cabinet is necessary due to the plurality of line connections, since otherwise each connector would have to be sealed and the line insulations would have to meet the specific requirements. This is constructively complicated and thus expensive.

Due to the limitations mentioned above, there is a need for a modular system in which the electronic modules and the pneumatic modules can be mounted in line in any order.

There is further a need for a modular system in which the individual modules which can be mounted in line are encapsulated and can do with a minimum of external line connections such that a mounting in a switch cabinet becomes unnecessary.

There is further a need for a modular system which also allows the use of passive modules, i.e. of modules which cannot decode the serial data of a control bus, and which can however comprise a plurality of modules.

SUMMARY OF THE INVENTION

The invention provides a modular system comprising a head module having at least one connection for an external bus signal on an external bus, at least one pneumatic supply connection, an electric supply connection and having a serial bus interface for an internal serial bus, an electric supply interface, a multipole interface and a pneumatic supply interface which are each led to the outside on the same side. The modular system further comprises at least one functional module having an internal serial bus line, electric supply lines, electric multipole lines and pneumatic supply lines which are each passed through from one side to the opposite side and which are each connected to a corresponding interface of the head module. The head module converts serial bus signals into multipole signals and outputs these signals at the multipole interface. The functional module selectively branches at least one of the multipole lines and, with a signal carried thereon, executes a pneumatic or an electric or both a pneumatic and an electric function.

All required lines, i.e. a serial bus, electric supply lines, electric multipole lines and pneumatic supply lines are thus directly led from the head module to the functional module without any intermediate line and are fed-through in this functional module. Since all lines mentioned, i.e. both electric data and supply lines and pneumatic supply lines are passed through in the functional module, an additional connection of the modules to external lines is unnecessary. This is particularly interesting on higher protection levels since each encapsulated connector represents additional work and additional costs. Due to the forwarding both of the electric and of the pneumatic lines, an arrangement in line of electronic and pneumatic modules in any order is further possible.

In a preferred embodiment, the multipole lines comprise input lines and output lines, and the head module comprises means with which multipole signals of the multipole interface can be converted in a serial bus signal. Due to the serial/parallel and the parallel/serial conversion in the head module, the functional modules can be structured as purely passive modules without any signal conversion and can still output acknowledgment signals to a central control. To the outside, the modular system comprises only an external serial interface.

In a further preferred embodiment, the head module comprises a bus extending connection which is branched off from the serial bus interface. A first expansion module comprising on one of its sides interfaces for a functional module can be connected thereto, at least one multipole interface of these interfaces being formed by analogy with that one of the head module. With the first expansion module it is possible to construct a remote modular system unit which is also connected to the external bus. The first expansion module preferably comprises a further bus extending connection to which a second expansion module can be connected.

In a further embodiment, the modular system further comprises at least one expansion intermediate module which can be inserted between two functional modules. The expansion intermediate module passes the internal serial bus line through from one side to the opposite side. It comprises on one of its sides a multipole interface for the functional module attached thereto. It comprises means with which serial bus signals on the internal bus are converted into multipole signals. Since each functional module branches at least one of the multipole lines, the number of functional modules which can be mounted in line is limited by the number of multipole lines as initially provided. Due to the expansion intermediate module it is possible to first lead control signals for further (passive) functional modules from the head module up to the expansion intermediate module in a serial manner and to carry out a conversion of the serial data into parallel data only in the expansion intermediate module. This eliminates the restriction to a small number of passive modules which can be mounted in line which is determined by the limited number of lines which can be led in parallel.

In a further development of this embodiment, the expansion intermediate module also converts multipole signals of the multipole interface into a serial bus signal. In a further embodiment, the expansion intermediate module comprises a separate electric supply connection such that within the modular system, an emergency shutdown function can be realized in segments or separate segment circuits can be defined with respect to the voltage supply. The expansion intermediate module can also comprise a connection for an external bus signal on an external bus. An interface to possible modules of a different manufacturer is thus realized.

In a further embodiment, a bus functional module which can be inserted between two functional modules or between a functional module and a termination module and which comprises a bus interface is provided in the modular system. The bus functional module preferably comprises at least one converter unit comprising at least one analog-digital converter and/or at least one digital-analog converter. This permits the output and the input, respectively of analog voltage values/analog current values. For example, a pressure measuring module allowing the detection of the analog pressure in the compressed-air channel of the module is conceivable.

In a further development of the modular system, a functional module having a pneumatic function comprises at least one separate acknowledgment connection. Due to the integration of the acknowledgment input into the pneumatic module, a confusion of the indicated acknowledgment signals is not possible anymore. Furthermore, the advantage of a considerably space-saving structure is produced and a higher protection level is obtained.

Preferably, at least one of the modules comprises a maintenance functionality which is perceptible via a diagnostic interface/programming interface. Due to the integration of a diagnostic interface, it is possible to output diagnostic and error messages in plain text, for example on a laptop computer. Through this interface it is further possible to carry out a software update without having to exchange electric components, as usual up to now.

The modules are preferably configured with an encapsulation on a higher protection level IP65/IP67. Preferably, engaging connectors having sealing rings and overlapping connecting collars are provided on the sides of the modules. The tightness of the modular system or of functional modules of the modular system is preferably produced by means of a partial potting. Here, the connections are preferably potted on the inside with a sealing substance. A cover bracket is preferably inserted with an interlocking fit between adjacent modules. Here, the cover bracket can be inserted only when the modules are locked. It is thus ensured that the modular system is produced on the protection level IP65/IP67 and that a mounting in a switch cabinet is not necessary.

The modular system preferably comprises a pneumatic expansion functional module in which the electric multipole input lines are converted into electric multipole output lines. It is thus possible to make multipole input lines which are not used utilizable as multipole output lines. With these multipole output lines it is thus possible to realize drivable pneumatic functions at low costs.

BRIEF DESCRIPTION OF THE DRAWINGS

Further advantages of the invention will become clear by the description of a preferred embodiment with reference to the accompanying figures.

These figures show.

DESCRIPTION OF THE PREFERRED EMBODIMENTS

Figure 1:
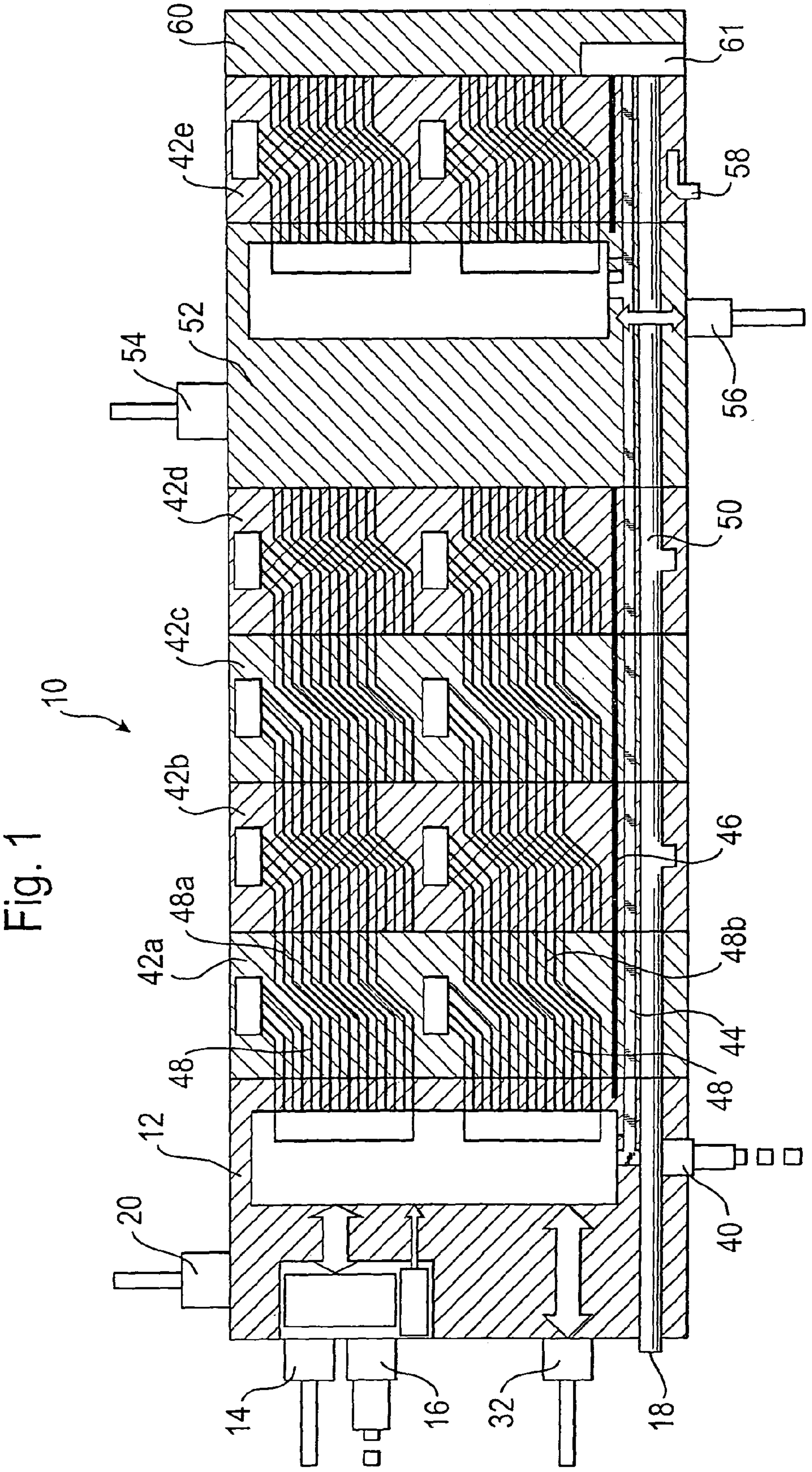
FIG. 1 a schematic representation of a modular system having a head module, six functional modules and a termination module, FIG. 1*a* an enlarged view of a detail of the head module of FIG. 1, FIG. 2 a modular system having two expansion modules, and FIG. 3 a perspective representation of a modular system according to the invention having a head module, four functional modules and a termination module.

FIG. 1 shows in a schematic representation a modular system 10 consisting of eight individual modules mounted side by side in line, a head module 12 being represented on the left side of FIG. 1. The head module 12 comprises a connection 14 for an incoming external bus and a connection 16 for an outgoing external bus. Here, the outgoing external bus is optional, it can also be replaced by a termination resistance. The head module 12 further comprises a pneumatic supply connection 18 and an electric supply connection 20. The interfaces which the head module 12 presents on the right side of FIG. 1 are designated in FIG. 1*a* which shows an enlarged representation of the head module 12. A serial bus interface 22 having an address line interface which is also indicated, an electric supply interface 24, a multipole interface 26 and a pneumatic supply interface 28 are led to the outside. The multipole interface is divided up in digital inputs 26*a* and digital outputs 26*b*. The head module contains processors 30 in which, apart from the conversion of the serial bus signals into parallel multipole signals, a decentralized intelligence can also be integrated. It is thus possible to realize a freely programmable small control. For this purpose, the head module 12 also comprises an additional bus interface 32 by means of which the user can program simple control processes at the head module, which leads to a relief of the main control. Further possible applications of the bus interface 32 are explained in the following description. The double arrow 34 indicates a signal transmission between the bus interface 32 and the processors 30. The head module 12 also contains a bus interface device 36 with an address register 38. Depending on the application case, the bus interface device 36 is designed for a usual field bus protocol. Profibus, CANopen, DeviceNET or also Ethernet are possibilities for bus protocols. The head module 12 comprises as a further interface a bus extending connection 40 which is explained in detail with reference to FIG. 2.

In FIG. 1, a passive functional module 42*a* is adjacent to the head module 12, followed by functional modules 42*b*, 42*c* and 42*d* and by a further functional module 42*e*. An internal serial bus line 44, electric supply lines 46, electric multipole lines 48—divided up in multipole input lines 48*a* and in multipole output lines 48*b*—and a pneumatic supply line 50 are each passed through from one side to the opposite side by the functional modules 42*a* to 42*d*. The pneumatic supply line 50 represented schematically comprises several channels by means of which supply air, exhaust air, auxiliary pilot air and pilot exhaust air is conveyed.

In each of the functional modules 42*a* to 42*d*, both a part of the multipole input lines 48*a* and a part of the multipole output lines 48*b* are branched off within the corresponding functional module 42. By providing digital multipole input and output lines 48*a*, 48*b*, fluidic specific modules such as vacuum injection modules, pressure control modules and filter modules can be integrated into the modular system 10. It is of course also possible to integrate specific electric or electro-pneumatic modules. Pressure indicating modules, pressure sensor modules, push switches and sensor modules are mentioned here as examples.

A branching off from the pneumatic supply line 50 is carried out in the modules 42*b* to 42*d*. The functional modules 42*b* and 42*d* are thus pneumatic functional modules, and the functional modules 42*a* and 42*c* are electronic functional modules. Of course, the modules 42*a* and 42*c* could also be pneumatic functional modules having a branching from the pneumatic supply line. The functional module 42*e* is provided with a separate pneumatic supply connection 58. It is thus possible to integrate valves into the modular system which require a different fluidic supply than provided on the pneumatic supply line which passes through all modules. Depending on the module type, the branched multipole output lines carry signals in order to execute pneumatic or electric or both pneumatic and electric functions. Correspondingly, acknowledgment signals such as sensor signals or function confirming signals pass via the multipole input lines. The multipole input lines can for example be used as a separate acknowledgment connection. Acknowledgment signals can thus be directly indicated in the functional module 42, and they are thus directly associated. Apart from an indication in the module itself, the acknowledgment signal can also be forwarded to a control device via the multipole lines or after the conversion in an active intermediate module via a serial bus line.

An expansion intermediate module 52 is inserted between two functional modules 42*d* and the further functional module 42*e*. The internal serial bus line 44 as well as the pneumatic supply line 50 are passed through in the expansion intermediate module 52. On its right side of FIG. 1, the expansion intermediate module 52 comprises a multipole interface for the functional module 42*e* attached thereto. The expansion intermediate module 52 comprises means with which serial bus signals of the internal bus are converted into multipole signals. Further functional modules 42 can thus be mounted in line since the expansion intermediate module provides new multipole input lines and multipole output lines. A limitation to the multipole lines initially provided by the head module 12 is thus eliminated. The signals which are to be conveyed on the new multipole lines are fed-through starting from the head module 12 via the internal serial bus line 44 through the functional modules 42*a* to 42*d*. In the embodiment represented in FIG. 1, the expansion intermediate module 52 comprises an additional supply connection 54. It is also possible to lead the supply lines 46 through the expansion intermediate module 52, but the separate electric supply connection 54 has the advantage that it permits a subdivision of the modular system in segments which can be turned on and turned off separately, for example in case of an emergency shutdown. In case of an error, only the modules of one segment have to be disconnected from the voltage supply and not the entire modular system.

The expansion intermediate module 52 further comprises a bus interface 56 via which an external bus signal of an external bus can be supplied into the expansion intermediate module 52. This bus interface can be for example a diagnostic interface/programming interface. A maintenance function for the connected functional modules can be perceived via this diagnostic interface/programming interface. At this interface, a plain text output for example for a laptop computer is possible for a diagnostic. The bus interface also permits a simple loading of a software update. It is of course also possible to carry out the maintenance functionality as well as the diagnostic and the loading of software updates via the internal bus 44 by means of the head module 12 which also comprises an additional bus interface 32 having the same functionality as the diagnostic interface/programming interface 56. In an industrial environment, it can be helpful to have a diagnostic interface/programming interface at the expansion intermediate module 52, too. The bus interfaces 32 and 56 can also be used for the connection to an external bus of a different manufacturer.

In a further expansion of the modular system which is not shown, a bus functional module, which compared with the represented expansion intermediate module 52 comprises only one bus interface for the connection to an external bus and which does not convert serial data into parallel data, can be inserted between two functional modules. Such a bus functional module can comprise an analog-digital converter and a digital-analog converter. It is thus possible to process analog measured values and to convey these values as digital values on the internal serial bus 44 after a conversion. Apart from the expansion intermediate module 52 which provides new multipole input and output lines through the conversion of serial bus signals into parallel multipole signals, an intermediate module converting multipole input lines which are not used into multipole output lines is also conceivable.

In FIG. 1, the expansion intermediate module 52 is followed by the functional module 42*e* which has essentially the same structure as the functional modules 42*a* to 42*d*. The functional module 42*e* is additionally provided with the separate pneumatic supply connection 58. It is thus possible to integrate valves into the modular system which require a different fluidic supply than provided on the pneumatic supply line passing through all modules.

As a termination, the modular system 10 represented in FIG. 1 comprises a termination module 60. The termination module 60 contains a termination resistance 61 for the serial bus line 44 and closes the pneumatic supply lines 50 in a suitable manner.

Figure 2:
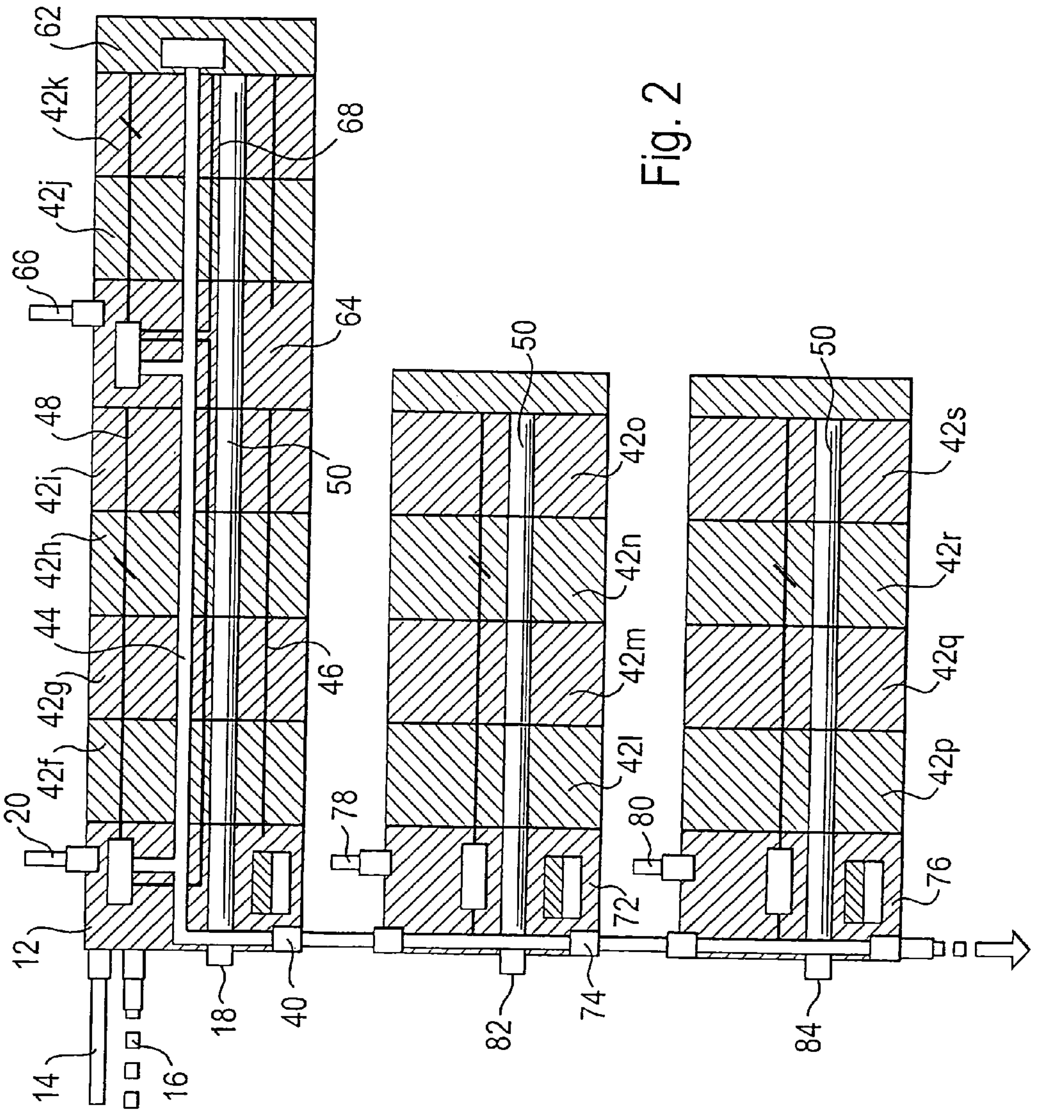

FIG. 2 shows a further possible structure of the inventive modular system. Accordingly to the description with reference to FIG. 1, functional modules 42*f* to 42*k* are connected to a head module 12 and the functional module 42*k* is followed by a termination module 62. An expansion intermediate module 64 comprising a separate supply voltage input 66 is inserted between the functional modules 42*i* and 42*j*. In the expansion intermediate module 64, the serial data are converted into parallel data that are output to the adjacent functional module 42*j* at the multipole interface. The head module 12 comprises a supply connection 20 and connections 14 and 16 for an incoming and an outgoing external bus. A pneumatic supply connection 18 is furthermore provided. The conversion of serial signals of the external bus into parallel multipole signals and the forwarding of serial signals to an internal serial bus is carried out in the head module 12. Starting from the head module 12, an internal serial bus line 44 and pneumatic supply lines 50 extend through all modules which are mounted in line. Multipole lines 48 and electric supply lines 46 are led through the functional modules up to the functional module 42*i* to which the expansion intermediate module 64 is adjacent. A conversion of serial signals of the internal serial bus 44 into parallel signals which are output to the adjacent functional module 42*j* at a multipole interface is carried out at the expansion intermediate module 64, and these multipole lines are again lead through the modules 42*j* and 42*k*. The expansion intermediate module 64 comprises a separate voltage supply 66 such that starting from this point, electric supply lines are led through the following functional modules 42*j* and 42*k*. An address line 68 is led in parallel to the internal bus.

Figure 1A:
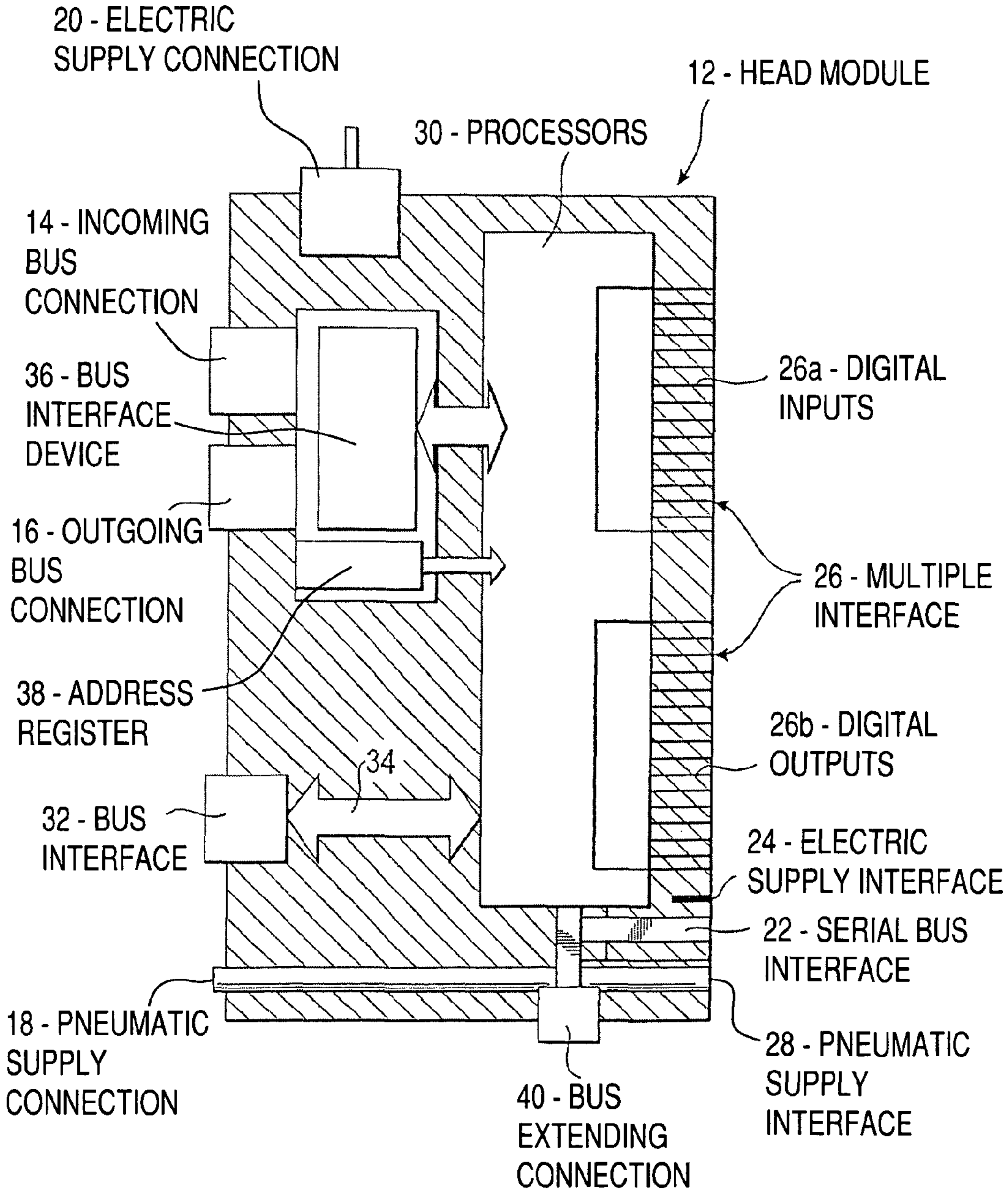

The head module 12 comprises the bus extending connection 40 which is branched off from the serial bus interface and is already shown in FIG. 1*a*. A first expansion module 72 is connected to this bus extending connection 40, the first expansion module comprising again a bus extending connection 74 to which a second expansion module 76 is connected. The second expansion module 76 also comprises a bus extending connection such that further expansion modules can be connected. The expansion modules each comprise a separate supply connection 78 and 80 and a pneumatic supply connection 82 and 84. Serial bus signals of the internal bus are converted into parallel signals in the expansion modules 72 and 76 and are each output at a multipole interface. Functional modules 42*l* to 42*s* are mounted in a known manner in line to the expansion modules 72 and 76. In the system structure represented, the functional modules 42*l* to 42*s* are pure multipole functional modules, i.e. the serial internal bus is not led through the modules, but the pneumatic supply lines 50. The internal bus can of course also be branched off in the expansion modules 72 and 76 such that a connection of functional modules having a serial internal bus 44 that is passed through, as are directly connected to the head module 12 in FIG. 2, is conceivable. Since the head module 12 provides a bus extending connection 40, an external field bus node is unnecessary. A system expansion can thus be obtained in a simple and cheap manner. Since bus lines are arranged between the head module 12 and the expansion module 72 and between the expansion module 12 an the expansion module 76, respectively, these system partial groups do not need to be adjacent, they can be remote units.

Figure 3:
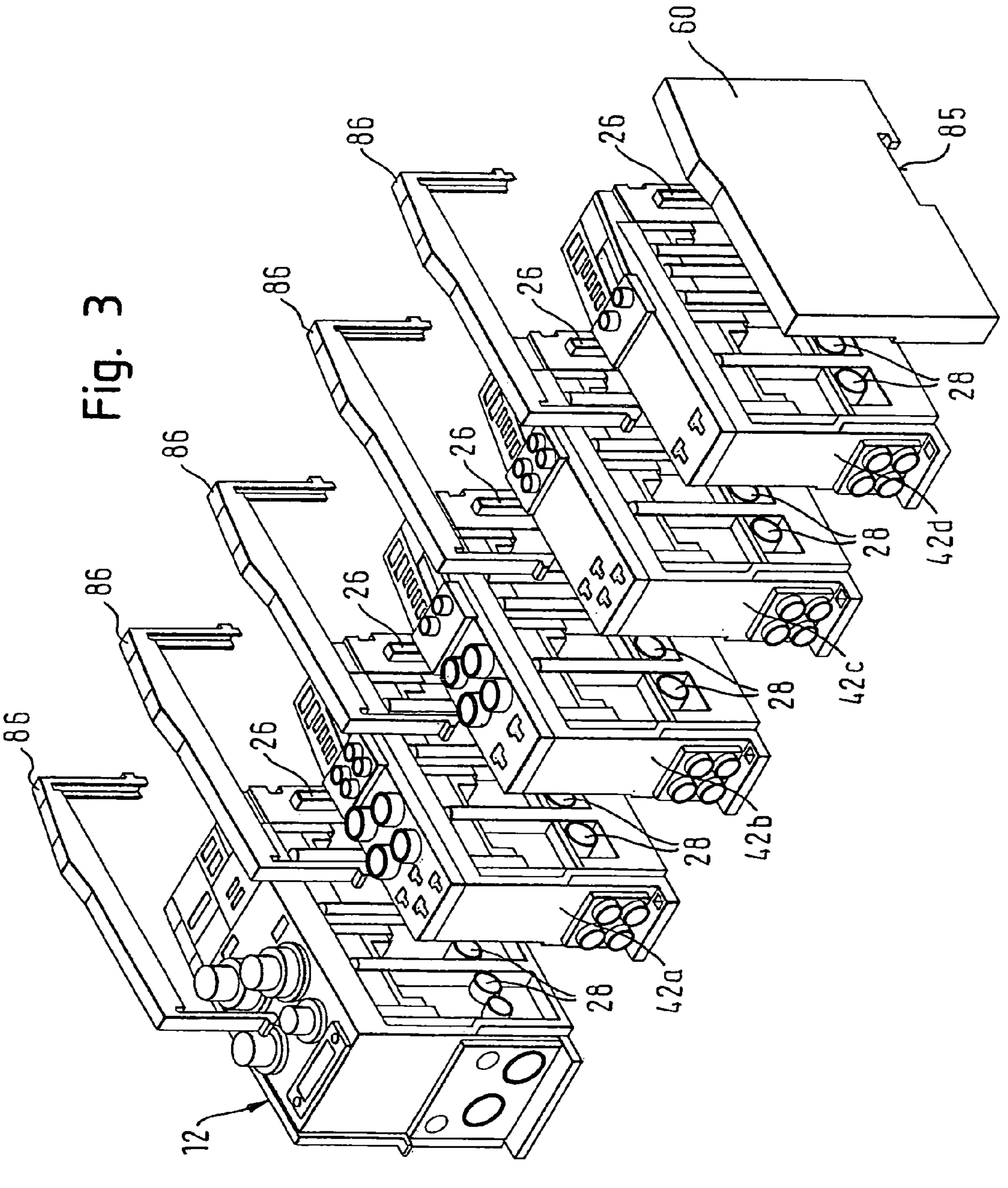

FIG. 3 shows in a perspective representation a modular system consisting of a head module 12, four functional modules 42*a* to 42*d* and a termination module 60 before assembling. The multipole interfaces 26 and the pneumatic supply interfaces 28 can be seen. The connectors on the sides are provided with sealing rings and overlapping connecting collars. The connections are potted on the inside with a sealing substance. The tightness of the modules is additionally ensured by a partial potting. A recess 84 present in all modules can be seen at the termination module 60. The modules can thus be mounted on a mounting rail. After the assembling of the modules and their locking with each other, cover brackets 86 are inserted with an interlocking fit between respective adjacent modules. This insertion can be realized only after the locking of the modules. The locking between the modules respectively occurs via three locking pins which are each shiftably mounted in a lateral wall of the module. For the locking, these pins are inserted in passages in the adjacent lateral wall of the module and locked by a rotation. The cover bracket 86 can be latched only in the inserted condition, i.e. only after the locking.

Due to the rigid housing and the locking of the modules with each other, a high stiffness of the modular system is obtained. In order to avoid contact problems in the connectors and to prevent that strong efforts are applied to the connector pins, the printed circuit boards are mounted in the housing in a floating manner. Due to this, the plugs are always in alignment and tolerances are equalized. A reliable ground connection between the printed circuit board mounted in a floating manner and the grounding pin rigidly mounted to the housing is however still ensured by the fact that the grounding pin potted on the inside presses through a spring steel element on the ground line present on the printed circuit board.

The invention claimed is:

1. A modular system consisting of individual modules which can be mounted side by side in-line, comprising a head module having at least one connection for an external bus signal on an external bus, at least one pneumatic supply connection, an electric supply connection and a functional module connecting face and an expansion module connecting face, the head module further having a serial bus interface for an internal serial bus, an electric supply interface, a multipole interface, a pneumatic supply interface and a bus extending connection which is branched off from said serial bus interface;

said serial bus interface, said electric supply interface, said multipole interface and said pneumatic supply interface each having a corresponding connector located on said functional module connecting face and said bus extending connection having a connector located on said expansion module connecting face;

and at least one functional module having an internal serial bus line, electric supply lines, electric multipole lines and a pneumatic supply line which are each passed through from one side to an opposite side and which are each connected to a corresponding interface of the head module;

the head module converting serial bus signals into multipole signals and outputting these signals at the multipole interface;

the functional module selectively branching at least one of the multipole lines and, with a signal carried thereon, executing a pneumatic or an electric or both a pneumatic and an electric function.

2. The modular system according to claim 1, wherein the head module converts multipole signals of the multipole interface into a serial bus signal.

3. The modular system according to claim 1, wherein the multipole lines comprise input lines and output lines.

4. The modular system according to claim 1, further including a first expansion module having a functional module connecting face and including a multipole interface with a corresponding connector located on said functional module connecting face.

5. The modular system according to claim 4, wherein the first expansion module comprises a bus extending connection to which a second expansion module can be connected.

6. The modular system according to claim 1, further comprising at least one expansion intermediate module which can be inserted between two functional modules, said expansion intermediate module passing the internal serial bus line through from one side to an opposite side and comprising, on one of said sides, a multipole interface for connection of a functional module, said expansion intermediate module converting serial bus signals on the internal bus into multipole signals available at said multipole interface.

7. The modular system according to claim 6, wherein said expansion intermediate module converts multipole signals into a serial bus signal.

8. The modular system according to claim 6, wherein the expansion intermediate module comprises a separate electric supply connection.

9. The modular system according to claim 6, wherein the expansion intermediate module comprises a connection for an external bus signal on an external bus.

10. The modular system according to claim 1, wherein a bus functional module is provided which can be inserted between two functional modules or between a functional module and a termination module and which comprises a bus interface.

11. The modular system according to claim 10, wherein the bus functional module comprises at least one converter unit.

12. The modular system according to claim 11, wherein the at least one converter unit comprises at least one analog-digital converter and/or at least one digital-analog converter.

13. The modular system according to claim 1, wherein a functional module having a pneumatic function comprises at least one separate acknowledgment connection.

14. The modular system according to claim 1, further comprising a pneumatic expansion functional module in which electric multipole input lines are passed through to electric multipole output lines.

15. The modular system according to claim 1, wherein at least one of the modules comprises a maintenance functionality.

16. The modular system according to claim 15, wherein the maintenance functionality is perceptible via a diagnostic interface/programming interface.

17. The modular system according to claim 15, wherein the maintenance functionality is perceptible via an internal bus interface.

18. The modular system according to claim 1, wherein the modules are configured with a protection encapsulation.

19. The modular system according to claim 1, wherein a functional module having a pneumatic function comprises its own pneumatic supply connection.

20. The modular system according to claim 1, further comprising inter-engaging module connectors with sealing rings and overlapping connecting collars.

* * * * *